April 30, 1929.   R. E. OVERSMITH   1,710,837
ATTACHMENT
Filed Oct. 22, 1928

INVENTOR
Ralph E. Oversmith
BY Marechal and Noe
ATTORNEYS

Patented Apr. 30, 1929.

1,710,837

UNITED STATES PATENT OFFICE.

RALPH E. OVERSMITH, OF KENMORE, NEW YORK, ASSIGNOR TO CONSOLIDATED AIRCRAFT CORPORATION, OF BUFFALO, NEW YORK, A CORPORATION OF NEW YORK.

ATTACHMENT.

Application filed October 22, 1928. Serial No. 314,169.

This invention relates to attachments or fasteners particularly adapted for fastening a belt or the like to a fixed frame part such as a frame tube of an airplane fuselage.

One object of the invention is the provision of a strong light fastener or attachment adapted to connect an aviator's belt with a part of the fuselage frame, the connection between the fastener and the fuselage frame being releasable in a convenient manner.

Other objects and advantages of the invention will be apparent from the following description and accompanying drawing, in which—

Figure 2:
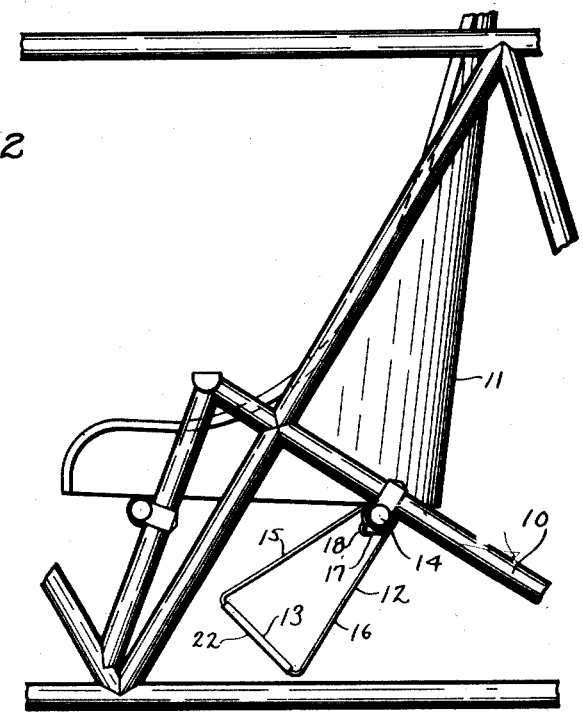
Fig. 2 is a side elevation of a part of an aircraft fuselage showing one application of the present invention.

In the drawing in which similar parts in the various views are designated by the same reference numerals, 10 designates generally a part of the fuselage framework of an aircraft which, as shown, is constructed of a number of hollow metal tubes welded together at their ends to form an integral rigid structure. On this frame there is supported a seat 11. As is frequent practice the aviator is held in the seat by a safety belt or strap, not shown, which is suitably attached to the aviator's body or over his legs so as to prevent him from falling out of the seat during various aircraft maneuvers. This belt, in accordance with the present invention is attached to the aircraft fuselage on each side of the seat by means of a fastener or attachment designated generally 12. An end of the belt is fastened in any suitable manner to the side 13 of the fastener and the fastener is held to a convenient tube 14 of the aircraft fuselage so as to adapt itself to a proper position when a belt is in use, and to permit the belt to lie out of the way at the side of the seat when it is not needed.

Figure 1:
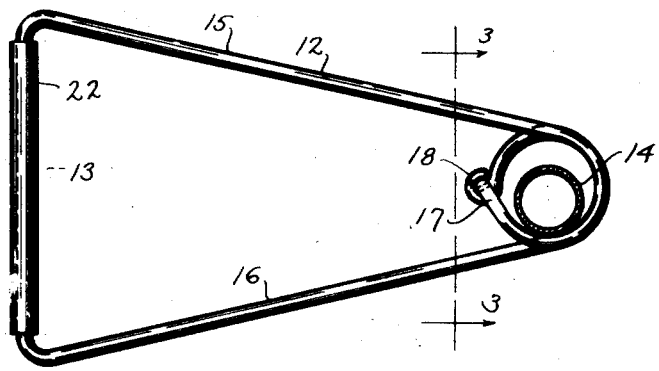
Fig. 1 is a view, in elevation, of a fastener or attachment embodying the present invention, the fastener being shown applied to a fuselage tube.
Figure 3:
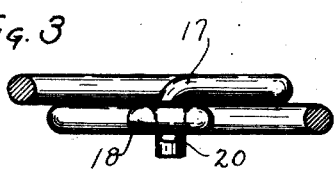
Fig. 3 is a section on the line 3—3 of Fig. 1.

As shown in Fig. 1 the fastener 12 is formed preferably as a metal loop, being constructed of a solid iron, aluminum or alloy rod bent to the form shown so as to provide a substantially triangular loop or link having the straight side 13 to which the belt is fastened and the converging sides 15 and 16 the ends of which are bent or curved so that the ends 17 and 18 respectively of these two converging sides are attached together at a point lying within the loop. The two ends 17 and 18 are hook shaped, the end 17 being bent laterally to extend into the ring shaped hook 18, the parts being retained in their attached or engaged position by a cross wire or cotter pin 20 which may extend through a suitable hole in the hook end 17. The curved end portions of the sides 15 and 16 provide a limited space which encloses the tube 14 of the fuselage, the space being considerably larger than the diameter of the fuselage tube 14. The attached parts of these sides 15 and 16 forms a cross member extending across the loop and serves to retain the proper end of the loop on the fuselage frame while permitting a quite loose attachment at this point so that the fastener may be conveniently and readily moved to desired positions.

As the attachment at the ends of the loop forms a detachably fastening means, the triangular loop may be applied to or removed from the fuselage frame work in a convenient manner. If a loop is broken another loop or fastener may be applied to the fuselage frame without interfering with the integral character of the frame. When applying a loop to a fuselage tube, the cotter pin 20 is removed and the two curved ends of the loop are separated laterally from one another by springing the metal which preferably has some degree of flexibility so that it is not necessary to sharply bend the metal of the loop at any particular point. After the two curved ends of the loop are sprung apart it is a simple matter to slip the loop over the fuselage tube, the curved ends of the loop being sprung slightly if need be if the tube 14 is somewhat larger than the opening provided between a hook end and the corresponding side of the loop. After the metal springs or is bent back into its original form the two curved ends lie together and hook 17 is inserted in the hook 18. The cotter pin 20 is then applied in position.

The side 13 of the loop to which the belt is adapted to be connected is preferably provided with a rigid metal reenforcing and rigidifying tube or sleeve 22, which may be fastened to the aviator's belt in any suitable manner. This belt is ordinarily quite wide,—preferably about as wide as the length of the reenforcing sleeve 22.

It will now be clear that even though the fastening loop or attachment is detachably fastened to the fuselage frame, its design is such that the pull exerted by the belt is applied to the frame by the two continuous sides 15 and 16 of the loop. Only a comparatively small pull is applied to the hook ends 17 and 18 tending to separate them as the ends of the loop are curved or snubbed around the tube 14, and the pull on the connected parts of the loop is not a direct pull. Consequently the fastener is of strong construction and may be made light in weight.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A fastener for holding an aviator's belt to an aircraft frame comprising a metal loop having hook ends adapted to releasably engage an adjacent part of the loop, the loop being bent to provide a part extending from one side to the other within the loop to provide a limited space within the loop in which the aircraft frame may be received, opposite portions of the loop extending uninterruptedly to and around the aircraft frame.

2. A fastener for holding an aviator's belt to an aircraft frame comprising a metal loop having detachably connected ends, said ends being both curved around the frame so that a space is provided between the connected ends and the outside of the loop in which the aircraft frame may be received.

3. A fastener for holding an aviator's belt to an aircraft frame comprising a metal loop having detachably connected ends, said ends being curved so that a space is provided between the connected ends and the outside of the loop in which the aircraft frame may be received, the connection being such that the pull of the belt is applied to the aircraft frame through opposite portions of the loop which extend uninterruptedly to and around the aircraft frame.

4. A fastener for holding an aviator's belt to an aircraft frame comprising a metal loop having detachably connected ends, said loop having a rigid straight side to which the belt is adapted to be fastened, the sides of the loop both extending convergingly from said straight side and around a part of the aircraft frame to a point of connection lying within the loop.

5. A fastener for holding an aviator's belt to an aircraft frame part comprising a metal loop having detachably connected hook ends, said loop being of substantially triangular shape having a straight side lying opposite the point of connection of said ends, a reenforcing metal sleeve extending the full length of said straight side, the adjacent sides of the loop each extending around the aircraft frame part to a point of attachment lying within the loop, said curved ends providing a limited space substantially larger than the frame part so that release of the loop from the part may be effected by springing the metal of the loop.

In testimony whereof I hereto affix my signature.

RALPH E. OVERSMITH.